Oct. 10, 1961     R. B. OWEN     3,004,167

NUCLEAR PARTICLE DISCRIMINATORS

Filed Sept. 4, 1959

INVENTOR

RICHARD BRUCE OWEN

BY Larson and Taylor

_United States Patent Office_

3,004,167
Patented Oct. 10, 1961

3,004,167
NUCLEAR PARTICLE DISCRIMINATORS
Richard Bruce Owen, Abingdon, England, assignor to United Kingdom Atomic Energy Authority, London, England
Filed Sept. 4, 1959, Ser. No. 838,222
Claims priority, application Great Britain Sept. 12, 1958
2 Claims. (Cl. 250—207)

This invention relates to nuclear particle discriminators of the kind which utilise differences in the pulse shapes of scintillation pulses produced by different kinds of particles. The possibility of distinguishing in this way between scintillations produced in organic phosphors was indicated by F. D. Brooks in Progress in Nuclear Physics, vol. 5, p. 284 (1956), and one particle discriminator of this kind is described in copending application Serial No. 681,974 filed 4th September, 1957, now forfeited.

According to the present invention a nuclear particle discriminator comprises a scintillation counter including a photomultiplier tube, means whereby a dynode of said tube is operable at a potential difference between it and the next subsequent electrode sufficiently small to produce space-charge limitation of the current leaving the dynode, means for deriving an output pulse from the dynode, and amplitude discriminating means for accepting those pulses which are above a given amplitude. The dynode is preferably the last dynode, the next subsequent electrode being the anode.

To enable the nature of the present invention to be more readily understood, attention is directed, by way of example, to the accompanying drawing wherein.

Figure 1:
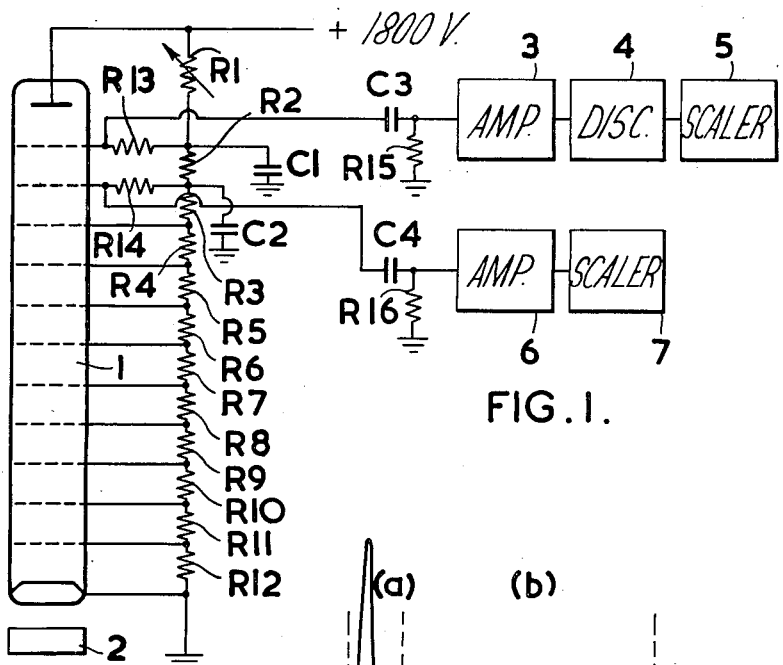
FIG. 1 is a circuit diagram of one embodiment of the invention.

In FIG. 1 a photomultiplier tube 1 having an associated scintillator 2 is shown with its cathode earthed and its anode connected to +1800 v. The photomultiplier dynodes are each connected to a tapping on a potentiometer chain consisting of resistors R1–R12 connected between +1800 v. and earth. The last dynode is connected to the junction of R1 and R2 via a resistor R13, and the penultimate dynode is connected to the junction of R2 and R3 via a resistor R14. The two junctions mentioned above are decoupled to earth by capacitors C1 and C2 respectively. The remaining dynodes are connected directly to tappings on the chain.

An output from the last dynode is taken via a capacitor C3 to a linear amplifier 3, the output from which is connected via an amplitude discriminator 4 to a scaler 5. Similarly an output is taken from the penultimate dynode via a capacitor C4 to a linear amplifier 6, the output from which is connected to a scaler 7. The units 3, 4, 5, 6 and 7 use conventional circuits well known to those skilled in the art and hence are shown in block schematic form. In practice C3 and its associated resistor R15 form part of the first stage of amplifier 3; similarly C4 and resistor R16 form part of the first stage of amplifier 6.

Component values etc. in the above-described embodiment are as follows:

Photomultiplier 1: EMI Type 6097
Scintillator 2: Liquid scintillator consisting of p-terphenyl (4 gm./litre)+POPOP (0.4 gm./litre) in toluene (oxygen-free). POPOP is 2,5-p-phenylene-bis(5-phenyl-oxazole).
R1: 50KΩ (max.)
R2, R3: 1.8MΩ
R4: 1MΩ
R5–R11: 470KΩ
R12: 1MΩ
R13, R14: 100KΩ
R15, R16: 1MΩ
C1, C2: 0.005µ f.
C3, C4: 50 pf.

The values of the resistors R2–R12 are such that the inter-dynode potentials are of the order of 100–200 v. as in conventional photomultiplier tube circuits. The resistor R1, however, is adjusted to such a value that the potential between the last dynode and the anode is only a few volts. In the present embodiment the optimum potential was found to be 2.75 v. The resistors R13 and R14 are effectively in parallel with the stray capacities of the respective dynodes, so that with the values stated the net charge received by each of the dynodes is highly integrated.

Figure 2:
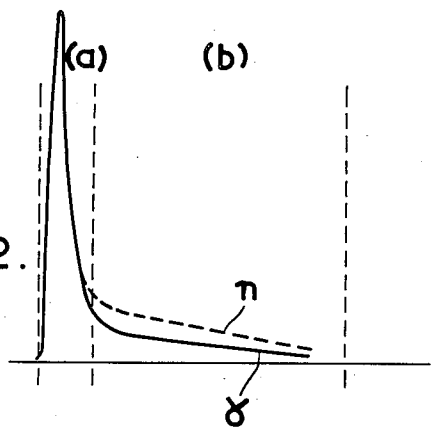
FIG. 2 shows a typical scintillation pulse.

The general shape of the scintillation pulses produced in organic scintillators such as terphenyl-POPOP-toluene by neutrons (or protons) and gamma rays (or electrons) is shown in FIG. 2. Each pulse comprises a short high-current portion (a) which is approximately the same shape for both particles, having a decay time to $1/e$ in the above case of about 3 nanoseconds, followed by a low-current portion (b) having a much longer decay-time. The decay-times of portion (b) for neutron and gamma pulses are of the same order, several hundred nanoseconds, but, as shown in FIG. 2, the amplitude of this portion is about twice as great in the case of neutron pulses as in the case of gamma pulses.

The effect of such a pulse on the circuit described above is as follows: During the early high-current portion of each pulse (portion (a) in FIG. 2) space-charge limits the current which can pass to the anode, and much of the multiplied charge is unable to leave the last dynode, with the result that this electrode is driven negative to an amount depending on the potential between the anode and the last dynode. During the low-current, slow-decay portion of the pulse (portion (b) in FIG. 2) space-charge limiting does not occur and a multiplied charge can now pass between the last dynode and the anode, driving the dynode in a positive direction. Whether the net charge on the last dynode is positive or negative as a result of each scintillation pulse depends on the relative charge contributions of the early high-current, and subsequent low-current portions of the scintillation pulse. R1 can be adjusted so that for scintillations in the organic scintillator 2 exceeding a minimum size above which space-charge limiting can operate, the pulses from the last dynode are positive in the case of neutron or proton excitation, in which the amplitude of the long decay-time portion is greater, and negative in the case of gamma or electron excitation, in which the amplitude of the long decay-time portion is smaller. Gamma or electron pulses of low energy can result in the appearance of small positive pulses instead of negative pulses at the last dynode, but an amplitude discriminator operating on the positive pulses is all that is required to separate out the neutron or proton pulses from the gamma or electron pulses.

The present embodiment has been used to separate out the scintillation pulses due to neutrons from those due to gammas in the radiation from a polonium-beryllium source (not shown). Suitable settings for counting the neutron pulses only were found to be:

Voltage between last dynode and anode_____v__ 2.75
Gain of amplifier 3_____ 1000
Threshold of discriminator 4_____v__ 20

In some applications the discriminator 4 may be adapted to operate at low threshold voltages thus allowing the amplifier 3 to be omitted.

The output from the penultimate dynode, which is not space-charge limited, to scaler 7 is provided to enable the total number of scintillation pulses, neutron+gamma, to be determined if required, or for pulse amplitude analysis. The provision of this output facility from the penultimate dynode is therefore optimal. One reason for providing such a facility is that by subtracting the readings of scalers 5 and 7 the number of gamma pulses can be determined, e.g. for health physics purposes. In some applications it may be convenient to substitute ratemeter circuits for the scalers. The subtraction processes can be done electronically in ways which will be readily apparent to those skilled in the art.

Figure 3:
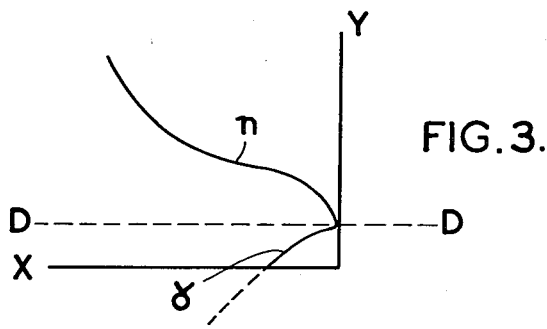
FIG. 3 represents a cathode-ray tube display obtainable with the embodiment of FIG. 1.

The output from the penultimate dynode can also be used in conjunction with a cathode-ray tube to adjust the potential of the last dynode with respect to the anode. After suitable amplification the pulses from the penultimate and last dynodes are stretched at their maximum amplitudes and applied to the X- and Y-plates respectively, whilst a brightening pulse is applied to the grid of the cathode-ray tube. The last-dynode/anode potential is adjusted until the resulting series of neutron and gamma spots on the tube lie on two loci of the form shown in FIG. 3. (FIG. 3 is drawn for a case where the Y-plate amplifier and stretching circuit did not accept negative pulses; hence no gamma spots lie below the X-axis. The true shape of the gamma locus is indicated by the dashed continuation.) The threshold of the discriminator 4 is then set at a level corresponding to the line D—D.

Another application of the invention is in monitoring instruments for measuring separately but simultaneously the alpha and beta/gamma contamination of a surface. In this case a suitable organic scintillator 2 is used, e.g. stilbene or anthracene, which exhibits pulse shape differences as between alpha and beta/gamma excitation. Alternatively the simple organic scintillator can be replaced by a composite scintillator comprising a sheet of a plastic scintillator such as p-terphenyl+POPOP loaded polyvinyltoluene about 0.125 inch thick, coated on one side with about 12 mg./cm.$^2$ of ZnS—Ag powder. A thin opaque window of aluminised terylene or aluminium foil, or both, is placed next to the ZnS—Ag phosphor to exclude light yet admit alpha particle thereto. Composite scintillators of this kind for use in another application were described by J. R. Brown in Paper P/294 at the Second United Nations International Conference on the Peaceful Uses of Atomic Energy, Geneva, 1958.

The energy of the alpha particles is substantially all expended in the ZnS—Ag, so that the scintillations from alpha particle excitation have a decay time characteristic of the ZnS—Ag phosphor, i.e. of the order of 1 or 2 microseconds. The beta particles and secondary electrons from gamma rays deposit considerably more of their energy in the organic phosphor than in the ZnS—Ag and consequently the scintillations from electron excitation have a decay time characteristic of the organic scintillator. Typically, with organic plastics, this is of the order of 2 or 3 nanoseconds, as already indicated.

The potentials between the dynodes of the photomultiplier tube are made about the same as those usually applied (100–200 v.) but, as described above, a suitably adjusted potential of about 5 v. is applied between the last dynode and the anode. Owing to space-charge limitation, the short decay-time pulses due to scintillations in the organic scintillator result in small negative pulses of roughly constant height appearing at the dynode. On the other hand the longer decay-time pulses due to scintillations in the ZnS—Ag result in large positive pulses, again of roughly equal height, at the dynode. As short decay-time pulses of low energy can result in the appearance of small positive pulses instead of negative pulses at the dynode, the amplitude discriminator is retained in the circuit, which thus separates out the alpha from the beta/gamma pulses. As before alpha+beta/gamma pulses can be obtained from an earlier dynode before space-charge limitation introduces non-linearity.

The invention can also be used with inorganic scintillators such as CSI—Tl or NaI—Tl, in which the pulses due to more heavily ionising particles such as protons and alpha particles differ in shape from each other and from those due to electron excitation, e.g. in NaI—Tl the pulse produced by alpha excitation rises sharply to a maximum and decays exponentially with a decay rate of about 0.25 microsecond, whilst the electron-excited pulse rises relatively slowly to a maximum about 0.15 microsecond after the initiation of the pulse and thereafter decays at about the same rate as the alpha-excited pulse. With these inorganic scintillators the less heavily ionising particle produces the larger positive pulse from the limiting dynode. i.e. the opposite effect from that observed in organic phosphors.

Although in the described embodiment highly integrated pulses are used, complete integration is not essential. Some integration is provided by the action of the photomultiplier space-charge, which is sufficient to operate the circuit with relatively low values of R13.

It will be appreciated that although in the described embodiment space-charge limitation is effected at the last dynode, the same effect can be produced at any preceding dynode by suitably adjusting the potential between it and the next succeeding dynode.

I claim:

1. A nuclear particle discriminator comprising a scintillation counter including a photomultiplier tube, means for deriving an output pulse from a dynode of said tube, means for applying operating potentials to the electrodes of said tube, said means being operable to provide a potential difference between said dynode and the next subsequent electrode sufficiently small for space-charge limitation of the current leaving said dynode to cause the polarity of the output pulse to depend on the shape of the scintillation pulse, and amplitude discriminating means for accepting positive output pulses above a given amplitude.

2. A discriminator as claimed in claim 1 wherein the dynode is the last dynode, the next subsequent electrode being the anode.

References Cited in the file of this patent

UNITED STATES PATENTS

| | | |
|---|---|---|
| 2,113,378 | Massa et al. | Apr. 5, 1938 |
| 2,717,316 | Madey | Sept. 6, 1955 |
| 2,742,576 | Dandl | Apr. 17, 1956 |
| 2,822,479 | Goldworthy | Feb. 4, 1958 |

OTHER REFERENCES

Brunson: "Transistorized Photomultiplier Has 0.1 Microsecond Resolution," Nucleonics, July 1957, pp. 86, 87.

Ryder et al.: "Large-Sensitive-Area Portable Alpha Monitor," Nucleonics, July 1957, page 82.